3,162,655
SYNTHESIS OF EQUILIN
Jehan F. Bagli, Montreal, Quebec, Canada, assignor to American Home Products Corporation, New York, N.Y., a corporation of Delaware
No Drawing. Filed June 24, 1963, Ser. No. 290,240
6 Claims. (Cl. 260—397.4)

This invention is concerned with steroid compounds and more particularly with the estrogen equilin (1,3,5,7-estratetraen-3-ol-17-one), intermediates in the production thereof, and a process for their preparation.

More specifically, this invention is concerned with a process particularly characterized by the use of the activity obtainable in a medium inoculated with *Nocardia restrictus* to convert 3β,17β,19 - trihydroxy-androst-5,7-diene or 19-hydroxy-androsta - 4,7 - diene-3,17-dione to equilin.

The process of the present invention may be represented schematically as follows:

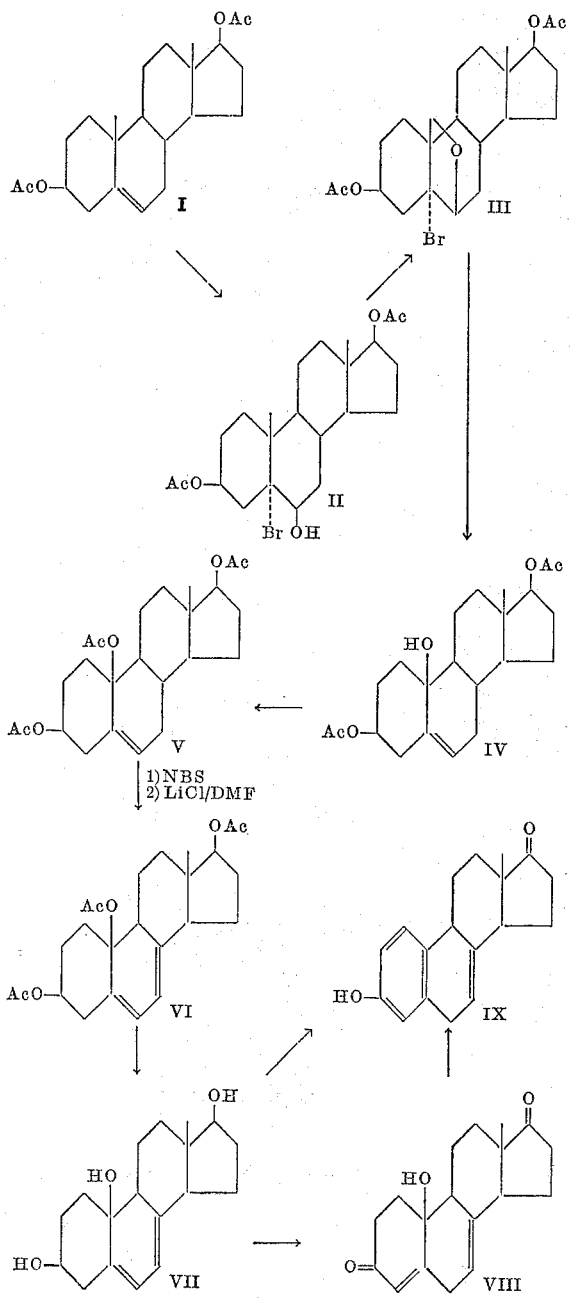

As shown, the starting material for the process of the present invention is 3β,17β-diacetoxy-androsta-5-ene (I). This compound is prepared from commercially available 3β-acetoxy-androst - 5 - ene - 17 - one as described by A. Butenandt and G. Hanisch, J. Physiol. Chem. 237, 89 (1935).

3β,17β-diacetoxy-androst-5-ene (I) is treated with an N-bromo-amide, such as N-bromosuccinimide to give a mixture of bromohydrins from which 3β,17β-diacetoxy-5α-bromo - 6β - hydroxy - androstane (II) previously described by V. Grenville, D. K. Patel, V. Petrow, I. A. Stuart-Webb, and D. M. Williamson in J. Chem. Soc. 1957, p. 4105, is isolated by conventional means such as by crystallization. The bromohydrin (II) is treated with lead tetraacetate in an inert solvent to give 3β,17β-diacetoxy-6β, 19-oxido-5α-bromo-androstane (III). This oxide is reductively cleaved, suitably by means of zinc dust in ethanol to yield 3β,17β-diacetoxy-19-hydroxy androst-5-ene (IV). Acetylation of the latter compound yields the corresponding triacetate (V). Treatment of the triacetate with N-bromosuccinimide followed by dehydrobromination affords 3β,17β,19-triacetoxyandrosta-5,7-diene (VI). Alkaline hydrolysis of the latter compound gives 3β,17β,19-trihydroxy androsta - 5,7 - diene (VII). Oppenauer oxidation of triol (VII) yields the corresponding ketone, androsta-4,7-diene-3,17-dione-19-ol (VIII). Exposure of this compound for a period ranging from about 15 minutes to about 3 hours to the activity obtainable in a medium inoculated with, for example, spores of *Nocardia restrictus*, yields equilin (IX).

In a variant of the present process, 3β,17β,19-trihydroxyandrosta-5,7-diene (VII) is subjected to the activity of *Nocardia restrictus* microorganisms for an incubation period of from about 3 to about 48 hours to directly yield equilin.

The following examples give details of the process of this invention:

EXAMPLE 1

3β,17β-Diacetoxy-6β-19-Oxido-5α-Bromo-Androstane (III)

To a solution of 3β,17β-diacetoxy-5α-bromo-6β-hydroxy-androstane (II, 25 g.) in a dry benzene (670 ml.) was added iodine (28 g.) and lead tetraacetate (100 g.) and the mixture was refluxed with stirring overnight. The mixture was cooled and 450 ml. of a 20% potassium iodide solution in water was added thereto. The resulting lead oxide was filtered and the aqueous layer was extracted with benzene. The total benzene extract was washed with sodium thiosulfate solution; followed by water, dried, and the solvent was removed to yield an oil which solidified over petroleum ether to give crystals M.P. 115–140°. Two crystallizations from methanol give oxide III M.P. 163–166°. An analytical sample obtained by further crystallization gave stout plates M.P. 178–179°, $\nu$ 1726 and 1500 cm.$^{-1}$, $[\alpha]_D^{24}$ —4° (c.=1% in CHCl$_3$),
Analysis.—Calcd. for $C_{23}H_{33}O_5Br$: C, 58.85; H, 7.08. Found: C, 59.07; H, 6.94.

EXAMPLE 2

3β,17β-Diacetoxy-19-Hydroxy-Androst-5-Ene (IV)

To a solution of oxide (III, M.P. 172–173.5°, 1.2 g.) in ethanol (105 ml.) was added zinc dust (12 g.) and refluxed with stirring overnight. The mixture was filtered hot and the zinc was washed with hot ethanol. The solvent was removed under reduced pressure. Residue (1.3 g.) was crystallized once from acetone-hexane to give plates M.P. 144–146°. An analytical sample prepared by repeated crystallizations followed by sublimation had M.P. 147.5–148.5°, $[\alpha]_D^{24}$ —56° (c.=1% in CHCl$_3$) $\nu$ 3600 and 1725 cm.$^{-1}$.

*Analysis.*—Calcd. for $C_{23}H_{34}O_5$: C, 70.74; H, 8.78. Found: C, 70.87; H, 8.75.

EXAMPLE 3

*Triacetate (V).*—Acetylation of 19-hydroxy androstane (IV) in pyridine and acetic anhydride yielded triacetoxy androstane (V), which was isolated in the usual manner. Crystallization from petroleum ether (B.P. 30–60°) gave prisms M.P. 88–89°, $[\alpha]_D^{24}$ —97° (c=1% in $CHCl_3$), $\nu$ 1724 cm.$^{-1}$.

*Analysis.*—Calcd. for $C_{25}H_{36}O_6$: C, 69.42; H, 8.39. Found: C, 69.61; H, 8.47.

EXAMPLE 4

*3β,17β,19-Trihydroxy-Androst-5,7-Diene (VII)*

7.1 g. of triacetate (V) was dissolved in 44 ml. of carbon tetrachloride and 3.04 g. of N-bromosuccinimide was added. Following the method of R. Antonucci et al., J. Org. Chem. 16, 1126 (1951), the mixture was irradiated with a General Electric lamp type RSP2, refluxed for 8 minutes, cooled quickly and filtered. The solvent was removed from the filtrate, and the residue treated for dehydrobromination.

The crude bromo compound was dissolved in 144 ml. of dimethylformamide and 3.56 g. of lithium chloride was added to it. The mixture was heated on a steam bath under nitrogen atmosphere for 2 hours. The resulting solution was poured into ice water containing concentrated hydrochloric acid (200 ml.) The liberated oil was extracted with ether, washed, dried and the solvent was removed, to give an oily residue. A careful chromatography of this oil on silica gel gave 3β,17β,19-triacetoxyandrost-5,7-diene (VI) $\lambda_{max}$ 282 mμ ($\epsilon$ 6660); 272 mμ ($\epsilon$ 6500). The crude triacetate obtained above was dissolved in methanol (20 ml.) and to it a solution of potassium hydroxide (2.0 g.) in methanol (5 ml.) was added and the solution was refluxed for one hour, cooled and filtered, to give 3β,17β,19-trihydroxyandrosta-5,7-diene (VII) M.P. 253–6°, $\lambda_{max}$ 282 mμ ($\epsilon$ 11,260), 272 mμ ($\epsilon$ 11,260).

*Analysis.*—Calcd. for $C_{19}H_{28}O_3$: C, 74.96; H, 9.27. Found: C, 75.03; H, 9.16.

EXAMPLE 5

*19-Hydroxyandrosta-4,7-Diene-3,17-Dione (VIII)*

To a dry solution of triol (VII, 0.320 g.) in toluene (3 ml.), diglyme (7 ml.) and cyclohexanone (12 ml.) was added aluminum isopropoxide (0.245 g.) and the solution refluxed for 20 minutes, cooled, poured in 25% acetic acid (10 ml.), and extracted with ether, washed with bicarbonate, water, dried and the solvents removed to yield a crude product (0.32 g.) A chromatography on Florisil gave on elution with ether; benzene 4:6 and with solvents of increasing polarities up to 100% ether, an oily material from which 19-hydroxyandrosta-4,7-dione (VIII) was isolated, M.P. 195–7°, $\lambda_{max}$ 240 mμ ($\epsilon$ 17,700), μ3460, 3620, 1733, 1663 cm.$^{-1}$.

EXAMPLE 6

*Equilin.*—Erlenmeyer flasks (250 ml. size), containing 50 ml. of a medium having a pH of about 5 (made up of a commercial glucose preparation, "Cerelose," 20 g., a protein hydrolysate, "Edamin," 20 g., corn steep liquor 5 g., distilled water 100 ml.) were inoculated with *Nocardia restrictus* and incubated at 25° C. for 64 hrs. After reinoculation of the culture and further incubation for 24 hrs., a sample of 3β,17β,19-trihydroxyandrosta-5,7-diene (VII), dissolved in propylene glycol was charged into the culture, the mixture was incubated from 3–48 hrs., samples were extracted with ethylene chloride, and the resulting extract evaporated to dryness under nitrogen.

The dry extract was dissolved in chloroform-methanol 1:1. Thin-layer chromatography showed the presence of equilin, dihydroequilin and some equilenin, all three compounds being identified by comparison with authentic samples.

Alternatively, the above described procedure was repeated using androsta-4,7-diene-3,17-dione-19-ol (VIII) as a substrate. It was found that this compound was converted to equilin as the only product in 15–180 minutes. The yields of equilin were best with 3-hour conversion, and the compound was identified as above.

EXAMPLE 7

*Equilin.*—A culture of *Nocardia restrictus* was incubated at 25° C. for 64 hours in the nutrient medium described in Example 6. The culture was then centrifuged to remove nutrient medium, resuspended in 1% phosphate buffer of pH 7, filtered through glass wool to remove mycelium, the filtrate centrifuged and the sediment resuspended in 1% phosphate buffer. The resulting suspension of oidiospores was adjusted to pH 4, 5, 6, or 8 with 1% phosphate buffer, and 25 mg. samples of 3β,17β,19-trihydroxyandrosta-5,7-diene (VII), dissolved in 1 ml. of propylene glycol, were added. The mixtures were incubated at 25° C. for 24 hours, extracted with ethylene chloride, and the extracts chromatographed. It was found that aromatisation to yield equilin had taken place at all pH levels between pH 4 and pH 8, but that pH 6 was optimal.

Alternatively the above procedure is used to convert androsta-4,7-diene-3,17-dione-19-ol (VIII) to equilin.

What is claimed is:

1. The process of preparing equilin which comprises treating 3β,17β-diacetoxy-androst-5-ene with an N-bromoamide to form the corresponding bromohydrin, treating the latter compound with lead tetraacetate to form the oxide thereof, treating said oxide with zinc dust in methanol to form 3β,17β-diacetoxy-19-hydroxy-androst-5-ene, acetylating said compound to form triacetoxy androstene, treating said compound with N-bromosuccinimide and then with lithium chloride to form 3β,17β,19-triacetoxyandrosta-5,7-diene, hydrolysing said compound in alkaline media to form 3β,17β,19-trihydroxyandrosta-5,7-diene, oxidizing said last compound under Oppenauer reaction conditions to form 19-hydroxyandrosta-4,7-diene-3,17-dione, subjecting said compound to the activity obtainable in a medium containing an agent selected from the group consisting of actively growing *Nocardia restrictus* and *Nocardia restrictus* spores, and recovering equilin from said medium.

2. The process of preparing equilin which comprises inoculating a nutrient medium with an agent selected from the group consisting of actively growing *Nocardia restrictus* and *Nocardia restrictus* spores, incubating said medium; introducing therein 3β,17β,19-trihydroxyandrosta-5,7-diene and recovering equilin.

3. The process of preparing equilin which comprises inoculating a nutrient medium with an agent selected from the group consisting of actively growing *Nocardia restrictus* and *Nocardia restrictus* spores, incubating said medium, introducing therein androsta-4,7-diene-3,17-dione-19-ol and recovering equilin.

4. 3β,17β,19-triacetoxyandrosta-5,7-diene.

5. 3β,17β,19-trihydroxyandrosta-5,7-diene.

6. 19-hydroxyandrosta-4,7-diene-3,17-dione.

References Cited in the file of this patent

UNITED STATES PATENTS 3,065,228   Bowers _____ Nov. 20, 1962

UNITED STATES PATENT OFFICE
CERTIFICATE OF CORRECTION

Patent No. 3,162,655　　　　　　　　　　　　　December 22, 1964

Jehan F. Bagli

It is hereby certified that error appears in the above numbered patent requiring correction and that the said Letters Patent should read as corrected below.

Column 1, formula IV should appear as shown below instead of as in the patent:

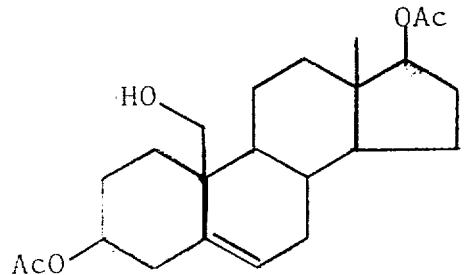

formula V should appear as shown below instead of as in the patent:

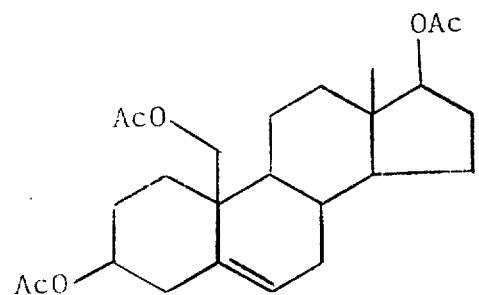

formula VI should appear as shown below instead of as in the patent:

1) NBS
2) LiCl/DMF

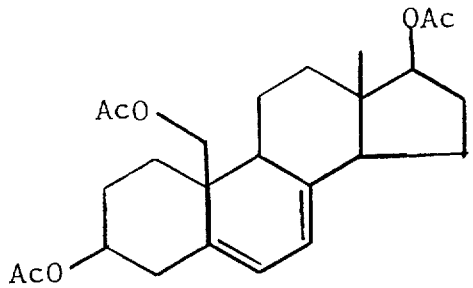

formula VII should appear as shown below instead of as in the patent:

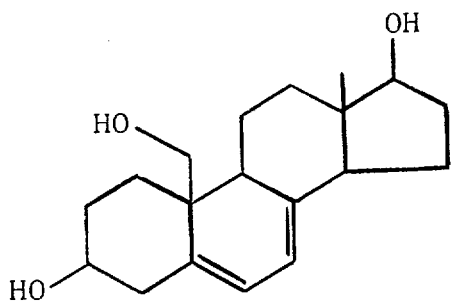

same column 1, formula VIII should appear as shown below instead of as in the patent:

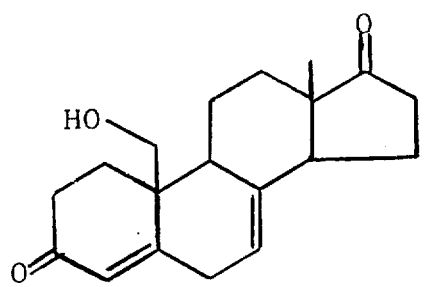

column 3, lines 46 and 47, for "(3 ml.)" read -- (30 ml.) --.

Signed and sealed this 15th day of February 1966.

(SEAL)
Attest:

ERNEST W. SWIDER
Attesting Officer

EDWARD J. BRENNER
Commissioner of Patents